United States Patent [19]

Thorne

[11] Patent Number: 5,406,691
[45] Date of Patent: Apr. 18, 1995

[54] APPARATUS FOR RECYCLING OIL FILTER CANISTERS

[75] Inventor: Thomas C. Thorne, Apple Valley, Minn.

[73] Assignee: Mikron Corporation, Mendota Heights, Minn.

[21] Appl. No.: 249,526

[22] Filed: May 26, 1994

[51] Int. Cl.6 .............................................. B23P 19/04
[52] U.S. Cl. .................................... 29/564.3; 29/240; 29/426.3; 82/101
[58] Field of Search ................... 29/564.3, 564.1, 33 R, 29/426.4, 426.3, 700, 27 R, 240, 403.33; 82/101

[56] References Cited

U.S. PATENT DOCUMENTS

| | | | |
|---|---|---|---|
| 5,133,234 | 7/1992 | Ehlert et al. | 82/92 |
| 5,182,842 | 2/1993 | Ross et al. | 29/240 |
| 5,205,195 | 4/1993 | Crosslen et al. | 82/92 |
| 5,214,830 | 6/1993 | Rozycki | 29/240 |
| 5,236,136 | 8/1993 | McCarty et al. | 241/24 |
| 5,243,754 | 9/1993 | Tasch et al. | 29/564.1 X |
| 5,274,906 | 1/1994 | ter Haar | 29/426.4 |
| 5,299,348 | 4/1994 | Slack et al. | 29/564.3 X |

Primary Examiner—William Briggs
Attorney, Agent, or Firm—Palmatier, Sjoquist & Helget

[57] ABSTRACT

An apparatus for recycling oil filter canisters comprises a canister cutting machine, an oil drain table, an oil storage tank and pump, a canister crusher, a paper insert crusher, and conveyors for transporting crushed canisters and paper inserts to their respective storage bins. The canister cutting machine comprises a rotating chuck for gripping the canisters and a cutting head assembly for cutting the end plates off the canisters.

20 Claims, 7 Drawing Sheets

APPARATUS FOR RECYCLING OIL FILTER CANISTERS

BACKGROUND OF THE INVENTION

This invention relates to an apparatus for recycling oil filter canisters, specifically to an automated apparatus.

Automobiles and trucks require a new engine oil filter approximately every 3000 to 5000 miles. With the millions of cars and trucks on the nation's roads, this amounts annually to many millions of old oil filters which must be disposed of. These oil filters are made of metal which has a significant value if recycled. The paper inserts in the oil filter canisters also have recycling value. The used oil trapped in the canister can also be recycled.

Although the need for recycling oil filter canisters is known, the process of recycling the canisters is labor intensive and messy. The canister must be cut open, the used oil drained out, and the paper insert removed. In order to store and transport the canister and insert efficiently, both must be compacted. Then the canister, oil, and paper must be separated into respective containers for storage and transport. Because the canisters and inserts are processed by different recyclers, the canisters must be kept free of debris from the inserts, and vice-versa. The canisters are difficult to cut open manually because of their cylindrical shape and thin walls, which make using a tool such as a hacksaw difficult and dangerous. The canister may be inadvertently collapsed during cutting, making it difficult or impossible to remove the paper insert. The canister, which is covered with oil and slippery, may roll during the cutting process, causing the operator's cutting hand to slip, resulting in physical injury to the operator.

There is a need for an automated apparatus for recycling oil filter canisters. The apparatus must be capable of quickly cutting open the canister so that the oil and paper insert may be removed. The apparatus must then compact both the canister and the paper insert while keeping them separate from each other. The compacted canisters and inserts must be automatically transported to storage bins. The used oil trapped within the filter must be drained out and pumped into storage tanks. The apparatus must be capable of processing several hundred canisters per hour, under the control of human operators.

SUMMARY OF THE INVENTION

An apparatus for recycling oil filter canisters comprises a canister cutting machine, an oil drain table, an oil storage tank and pump, a canister crusher, a paper insert crusher, and conveyors for transporting crushed canisters and paper inserts to their respective storage bins. The canister cutting machine comprises a rotating chuck for gripping the canisters and a cutting head assembly for cutting the end plates off the canisters.

An object and advantage of the invention is that the cutting machine allows a number of human operators to work concurrently.

Another object and advantage of the invention is that the canisters are cut open quickly without being collapsed, thereby enabling the removal of the paper inserts.

Another object and advantage of the invention is that the cutting machine securely holds the canisters while they are being cut, greatly reducing the risk of physical injury to the operators.

Another object and advantage of the invention is that used oil trapped in the canisters may be collected, stored and recycled with little human effort.

Another object and advantage of the invention is that it provides separate crushers for the canisters and paper inserts, rims providing for simultaneous processing of the canisters and inserts and keeping the respective recyclable materials free from each other.

Another object and advantage of the invention is that it provides separate conveyors for transporting the crushed canisters and paper inserts to storage bins.

DETAILED DESCRIPTION OF THE PREFERRED EMBODIMENTS

Figure 1:
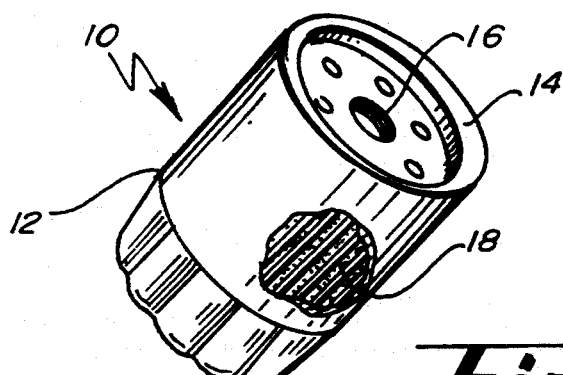
FIG. 1 is a perspective view of an oil filter canister, with some structure cut away.

Oil filter canisters 10 as seen in FIG. 1 consist of a cylindrical body 12 with a circular end plate 14. The end plate 14 has a hole 16 by which the canister 10 is screwed onto the engine. Contained within the canister 10 is a paper insert 18.

Figure 2:
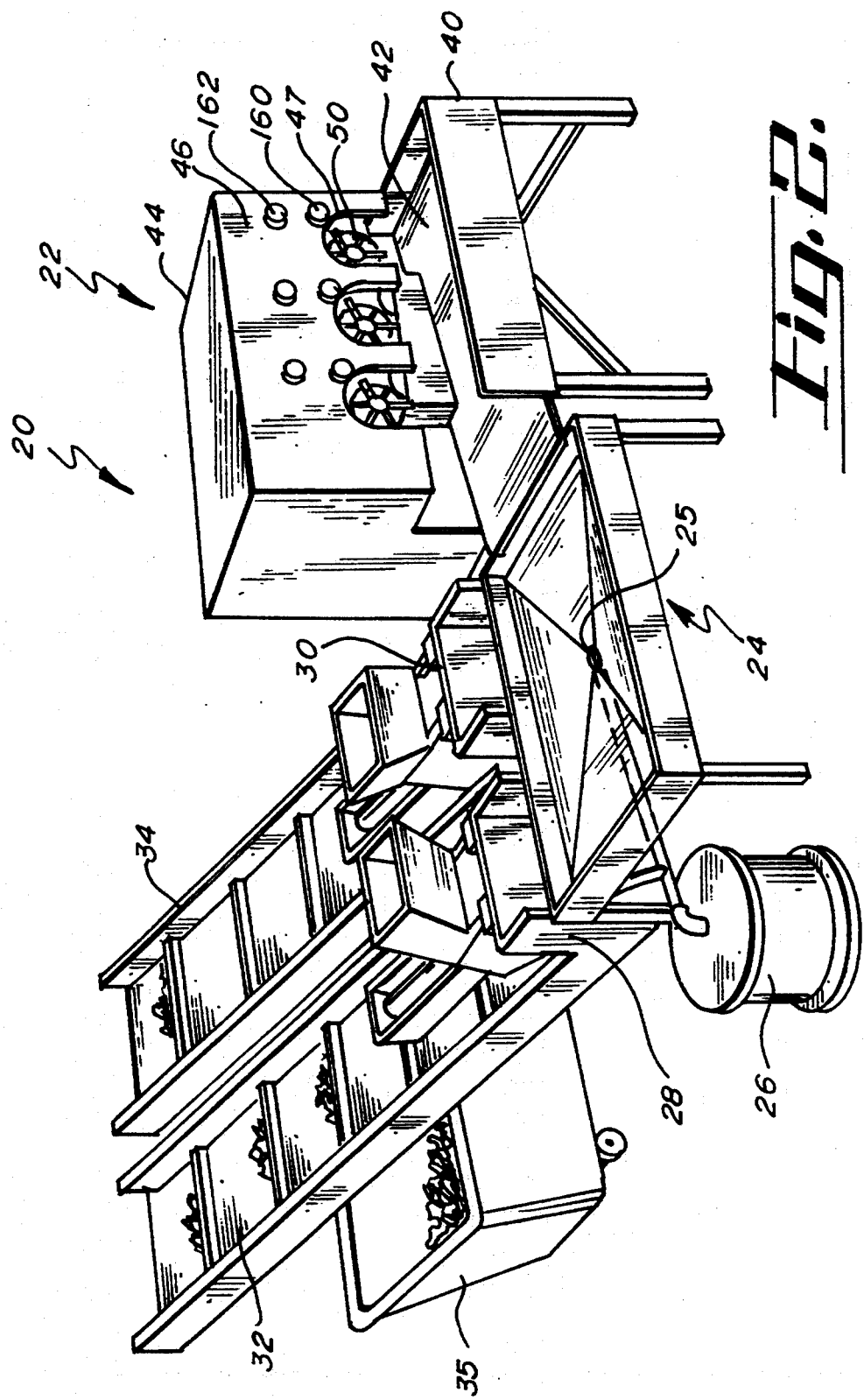
FIG. 2 is a perspective view of the oil filter recycling apparatus.

FIG. 2 shows an apparatus 20 for recycling oil filter canisters which comprises an oil filter canister cutting machine 22, a means 24,26 for collecting and storing used oil from the oil filter canisters which consists of an oil drain table 24 positioned adjacent to the cutting machine 22 during operation and an oil storage tank 26 connected to the oil drain table 24, a canister crusher 28 and a paper insert crusher 30, both adjacent to the oil drain table, a means 32,34 for transporting crushed canisters and paper inserts consisting of a canister conveyor 32 adjacent to the canister crusher 28 and a paper insert conveyor 34 adjacent to the paper insert crusher 30, and storage bins 35 for the crushed canisters and inserts.

In the preferred embodiment, the cutting machine 22 consists of a table 40 with an inclined top 42. A cabinet 44 is mounted to the table 40 behind the top 42 and houses the cutting machinery. The cabinet has a hinged front lid 46 with a number of access cut-outs 47 into which the operator inserts oil canisters to be cut. The cutting machine 22 further comprises gripping chucks 50 mounted on the cabinet 44 facing the operators and disposed within the cut-outs 47 as to be accessible to the operators. The gripping chucks 50 are rotated by a rotating means 52, preferably an electric motor, mounted within the cabinet 44.

Mounted in the cabinet 44 above the chucks 50 and behind the hinged front lid 46 are cutting head assemblies 60. The cutting head assemblies 60 move downward to contact the rotating canisters 10 while the canisters 10 are being gripped by the chucks 50, as will be described further.

The cutting machine 22 also comprises a control means 64 for controlling and coordinating the action of the gripping chucks 50, rotating means 52, and cutting head assemblies 60.

Figure 3:
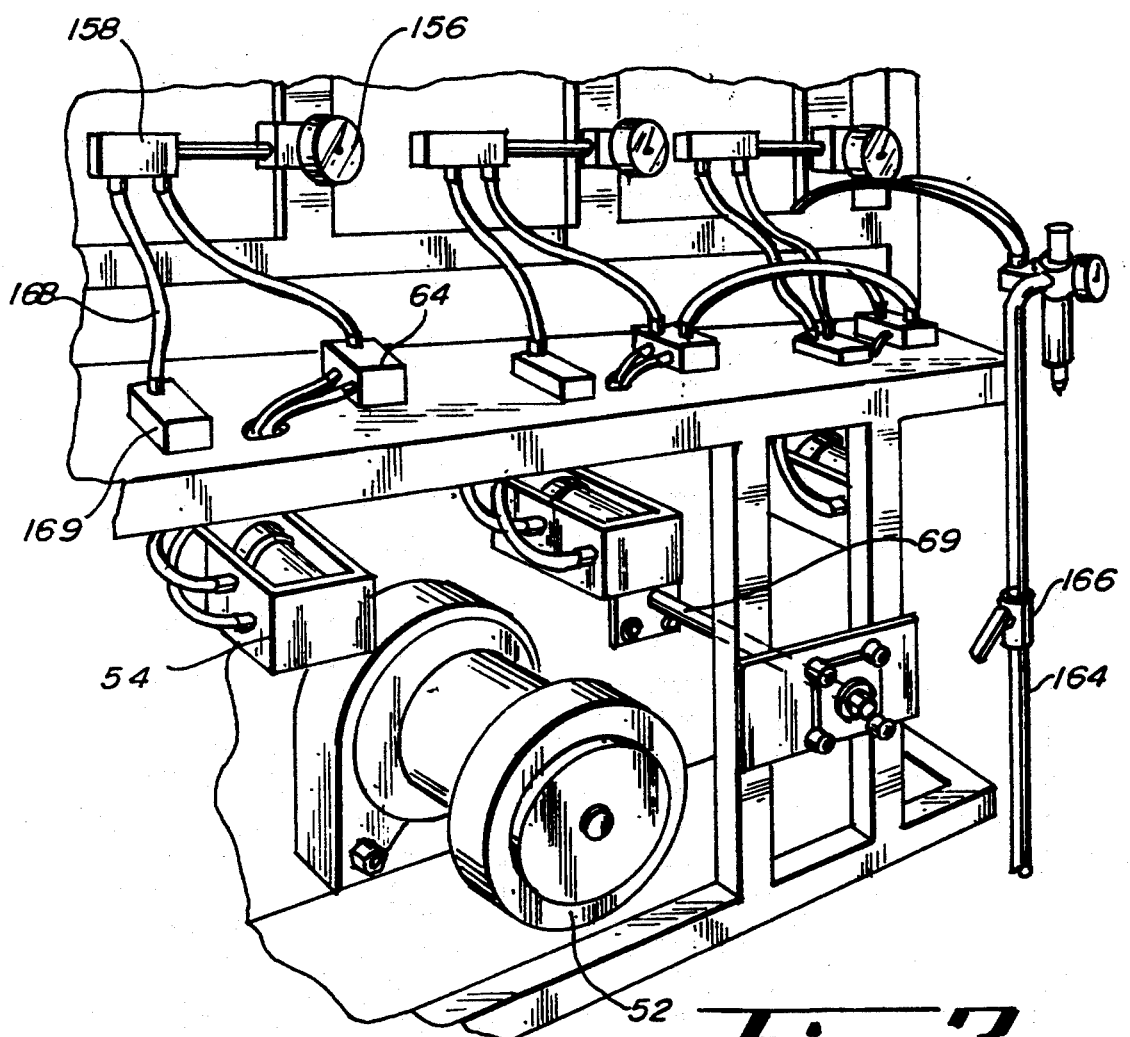
FIG. 3 is a rear perspective view of the cutting machine.
Figure 4:
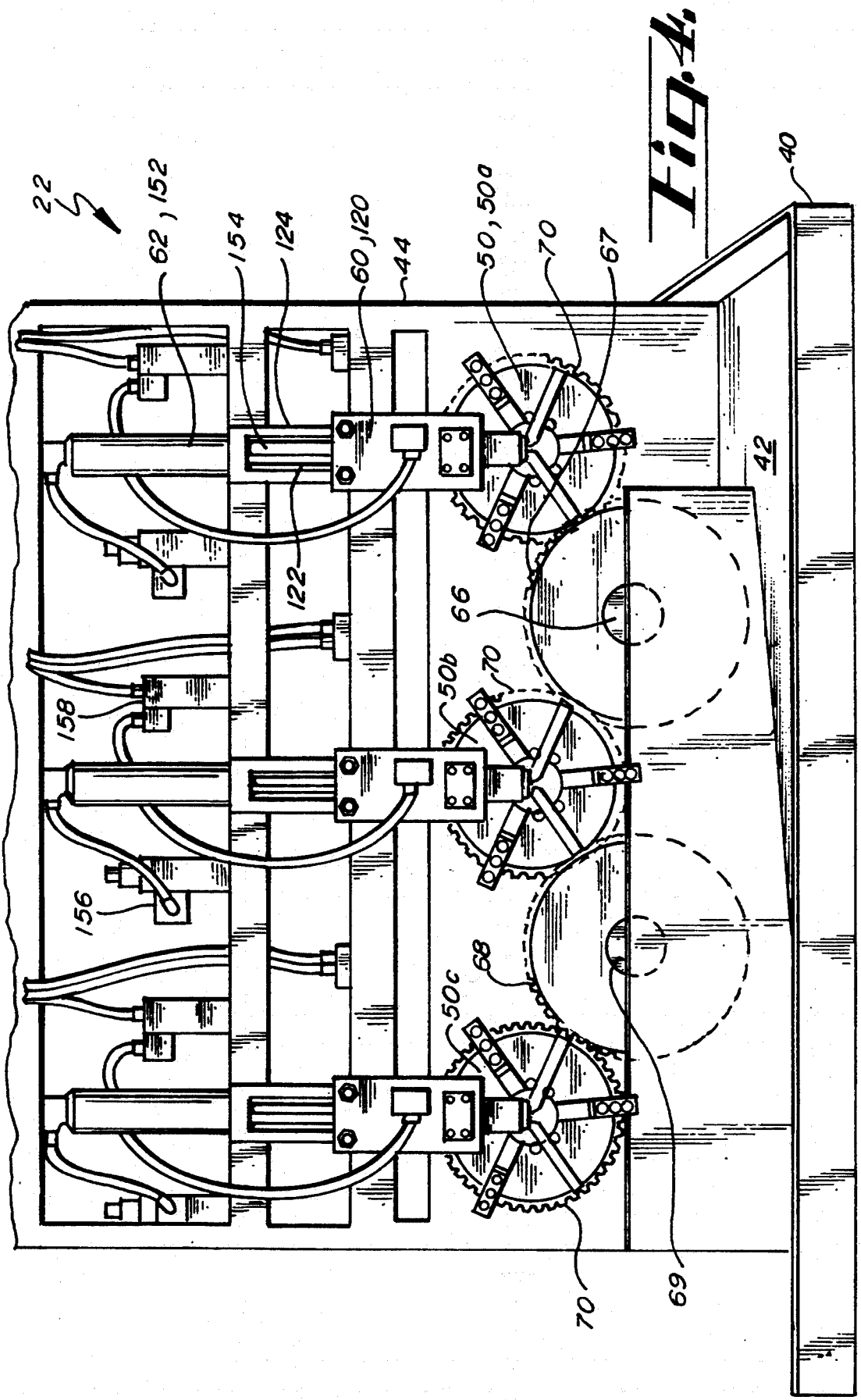
FIG. 4 is a front elevation of the cutting machine.

As seen in FIGS. 3 and 4, the motor 52 is mounted within the cabinet 44 and the shaft 66 of the motor protrudes through the cabinet 44 and a driver gear 67 is mounted on the shaft 66. An idler gear 68 on the shaft 69 is mounted on the cabinet 44. Each gripping chuck 50 has a chuck plate gear 70 which meshes either with the driver gear 67 or the idler gear 68 for rotation by the motor 52.

Figure 5:
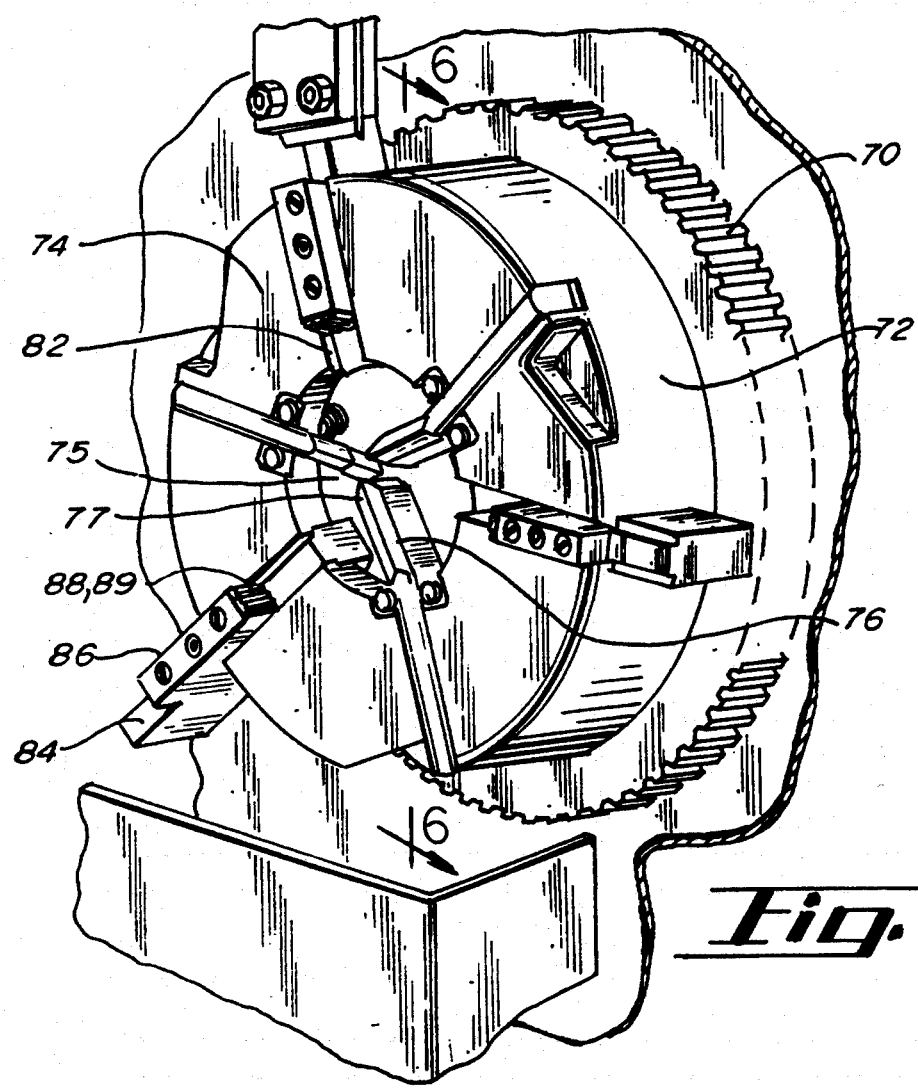
FIG. 5 is a cut-away detailed perspective of the gripping chuck.
Figure 6:
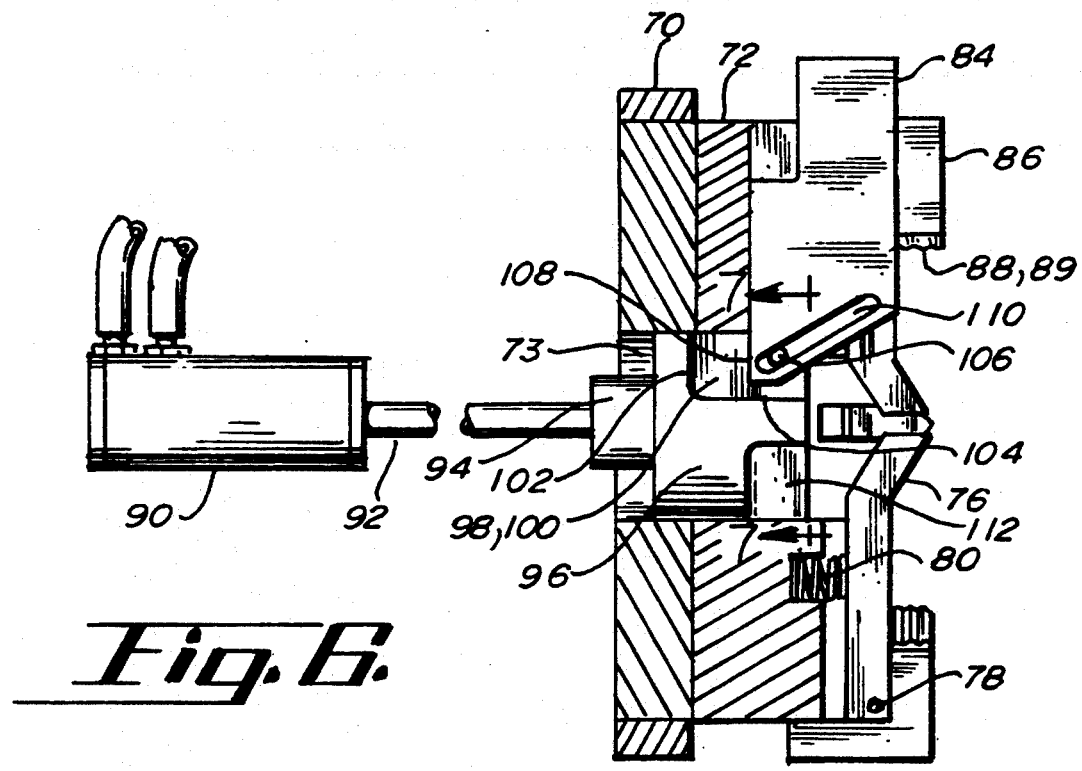
FIG. 6 is a sectional view along the line 6—6 of FIG. 5.

The chuck 50 has a substantially cylindrical chuck body 72 attached to the chuck plate gear 70. As seen in FIGS. 5 and 6, the chuck body 72 and chuck plate gear 70 have a central core 73 communicating at the front face 74 of the chuck body 72 with an open center 75. Mounted on the chuck body 72 is a means 76 for indexing and centering the oil filter canister 10 on the chuck 50, consisting of a plurality of spring-biased, pivoting index fingers 76 for indexing into the hole 16 in the base plate 14 of the canister 10. The fingers are mounted to the front face 74 so that the tips 77 of the fingers 76 are disposed concentrically within the center opening 75. The fingers 76 are mounted on pivots 78 and biased toward the front face 74 by springs 80. In the preferred embodiment, there are three fingers 76 which are separated angularly from each other by an angle of 120 degrees.

The from face 74 of the chuck body 72 has a plurality of radial channels 82 machined therein. In the preferred embodiment, there are three channels 82 separated angularly from each other by an angle of 120 degrees. Within each channel 82 there is slidably mounted a means 84 for gripping the oil filter canister 10, comprising a gripper arm 84, the arms 84 thereby reciprocating radially inwardly and outwardly about the central open core 73 of the chuck body 72.

The gripper arms 84 each have a gripper bar 86 mounted on the front surface of the arm 84 and outside the chuck body 72. A gripper plate 88 with a rough gripping surface 89 for gripping the oil filter canister 10 is mounted on the gripper bar 86 on the end of the bar 86 nearest the central core 73 of the chuck body 72 and parallel to the central core 73 of the chuck body 72. Only one gripper arm is shown in FIG. 6, it being understood that the other gripper arms are the same.

The gripper arms 84 are actuated to grip rite oil filter canister 10 as can be seen in FIG. 6. The gripping chuck 50 further comprises a gripper air cylinder 90 and rod or ram 92 disposed behind the central core 73 of the chuck body 72, a bearing assembly 94 connected to the piston 92, and a plunger, piston or actuator 96 connected to the bearing assembly 94 and to the gripper arms 84 and slidably engaged within the central core 73. The plunger 96 causes the gripper arms 84 to reciprocate radially within the radial channels 82, translating the axial motion of the piston 90 into the radial motion of the gripper arms 84, as is described below.

The plunger 96 has a gripper arm cut-out 98 with an outer wall 100, rear wall 102, and a horizontal wall 104. A pin 106 is mounted on the outer wall 100 substantially perpendicular thereto and transversely to the central core 73. The inner end 108 of the gripper arm 84 is cam-shaped and slidably engages with the horizontal wall 104 of the cut-out 98 as the cut-out 98 moves axially forwardly and rearwardly within the core 73. The gripper arm 84 has a slot 110 disposed at a slight upward angle substantially parallel to the inner end 108 of the gripper arm 84. The pin 106 is slidably engaged within the slot 110.

The plunger 96 also has a finger cut-out 112 which allows the finger 76 to move rearwardly without interference.

Figure 11:
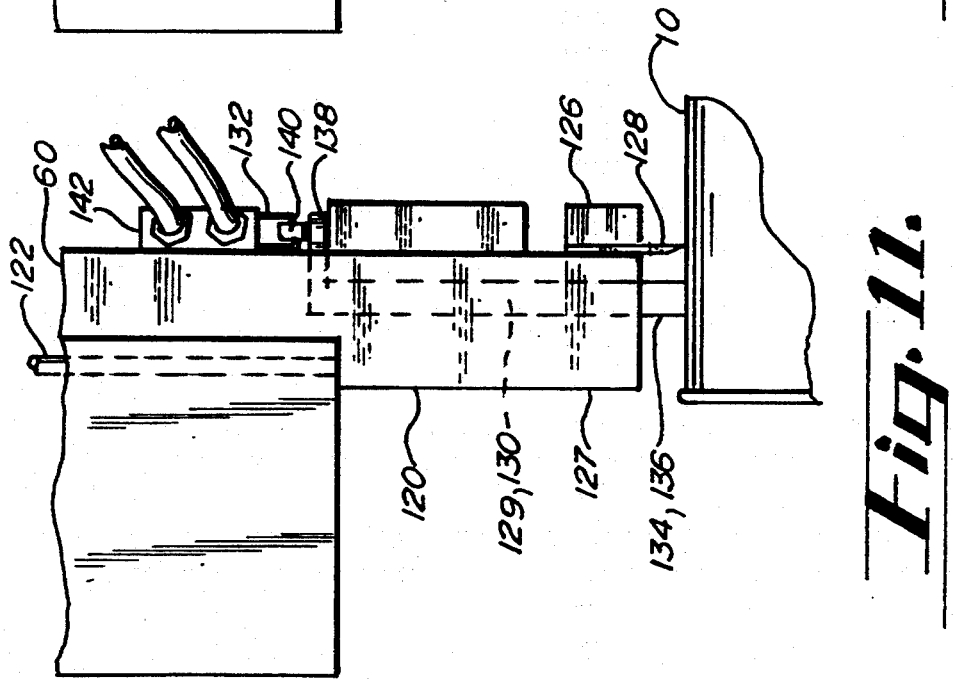
FIG. 11 is a cut-away detail of the cutting head assembly before cutting an oil filter canister.

The cutting head assemblies 60 are mounted in the cabinet 44 above the chucks 50. FIG. 11 shows the detail of the cutting head assembly. The cutting head assembly 60 comprises a housing 120 slidably mounted on a guide rail 122, which is in turn mounted on a backing plate 124. A cutter clamp 126 mounted on the lower end 127 of the housing 120 holds a cutting blade 128, which in the preferred embodiment is a section of a cobalt band saw blade. Them is also provided a sensor means 129 for detecting when the oil filter canister 10 has been cut, as follows. An L-shaped return actuator arm 130 is slidably mounted within the housing 120 and biased downward toward the rotating oil filter canister 10 by a spring 132. The lower end 134 of the return actuator arm 130 comprises a wear button 136 aligned with the cutting blade 128, so that the blade 128 and wear button 136 simultaneously contact the rotating filter canister 10. The upper end 138 of the return actuator presses against a roller 140, biased by the spring 132. The roller 140 activates an air switch 142 for controlling an air cylinder, as will be described below.

As can be seen in FIG. 4, the cutting head assembly 60 also comprises a means 152 for moving the cutting blade against the rotating oil filter canister, which comprises an air cylinder 152 with a piston 154 connected to the housing 120 so as to move the housing upwardly and downwardly with respect to the rotating filter canister 10. A regulator 156 controls the force with which the cutting blade 128 is brought into contact with the rotating filter canister 10, thereby preventing the canister 10 from being collapsed. An air timer 158 is controlled by the air switch 142 so as to delay the cutting blade 128 from retracting from the rotating filter canister 10 after the canister 10 is cut.

The cutting machine also comprises a control means 64 for coordinating the action of the gripping chucks 50, motor 52, and cutting head assemblies 60. The control means further comprises a cycle start button 160 for causing the gripping chuck 50 to grip the oil filter canister 10, a reset button 162 for causing the cutting head assembly 60 to reset against the oil filter canister 10, and the appropriate compressed air source 164, air valves 166, tubing 168 and controls 169 to actuate and coordinate the cutting machinery.

Operation of the cutting machine will now be described. The machine will first be connected to a suitable supply of compressed air 164 and to a supply of electrical current for driving the electric motor 52. As the electric motor 52 spins, the motor 52 will drive the driver gear 67 via the shaft 66. The driver gear will in turn drive two of the chucks 50a and 50b. The center chuck 50b will drive the idler gear 68, and the idler gear 68 will drive the third chuck 50c.

Figure 8:
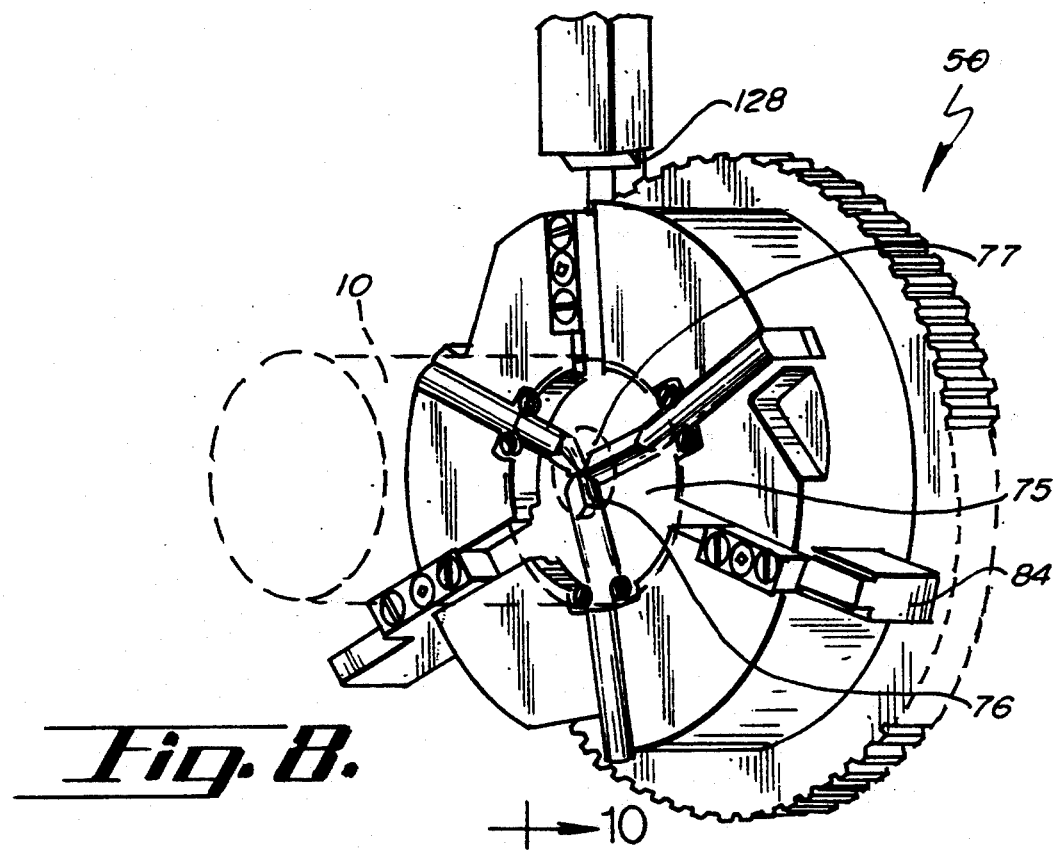
FIG. 8 is a perspective view of a gripping chuck showing an oil filter canister, in phantom lines, mounted thereon.
Figure 9:
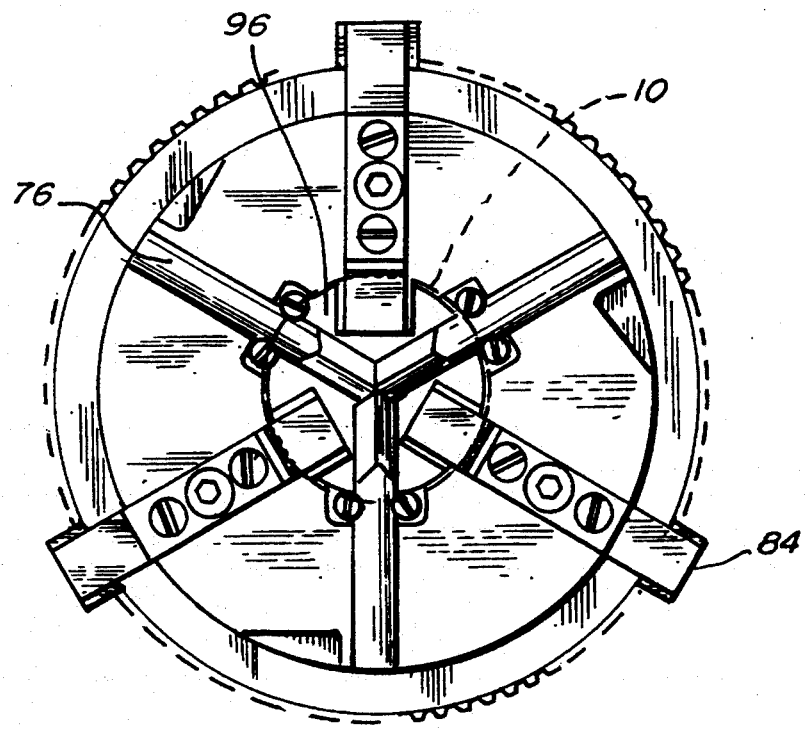
FIG. 9 is a from elevation of a gripping chuck, showing an oil filter canister mounted thereon.

After the chucks 50 have been spun up to the proper speed, about 100 rpm, the operator will grip an oil filter canister 10 in one hand and press the canister 10 against the index fingers 76, as seen in FIG. 8. The tips 77 of the fingers 76 will index the hole 16 in the end plate 14 of the canister 10, thereby centering the canister 10 on the chuck 50. As the operator increases the pressure against the fingers 76, the fingers 76 will pivot inwardly within the center ring 75, biased by the springs 80 so that the base plate 14 may be pressed tightly against the front face 74 of the chuck body 72.

Figure 10:
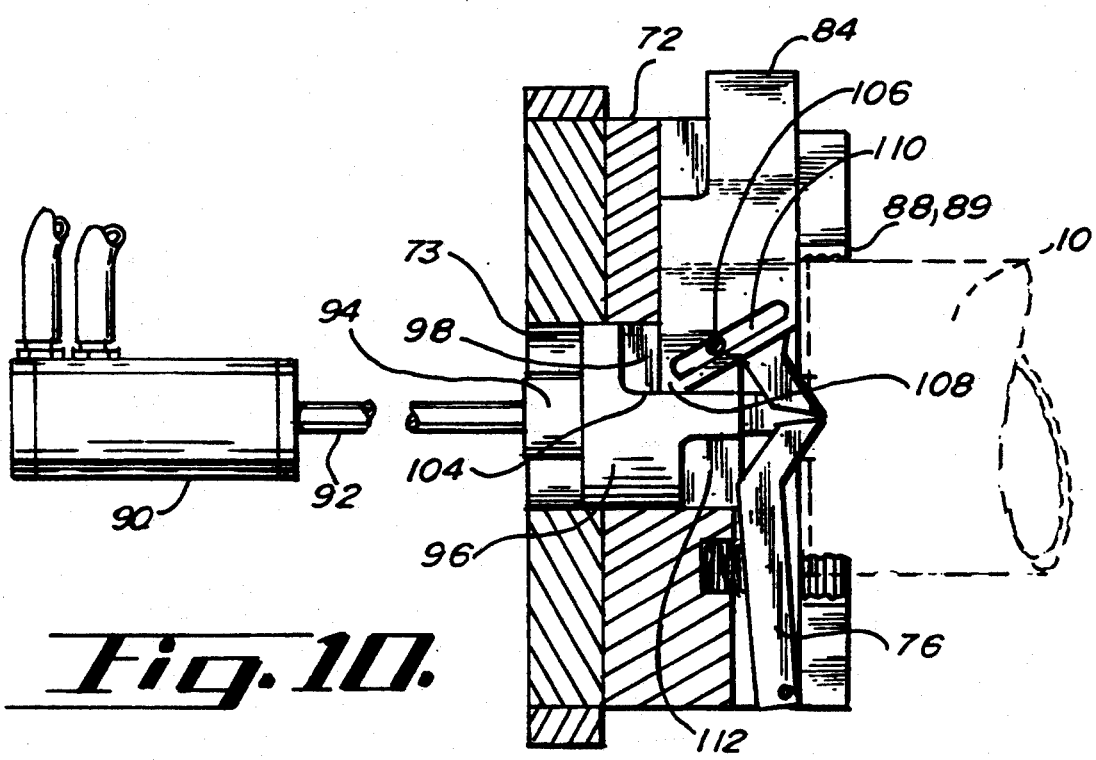
FIG. 10 is a sectional view along the line 10—10 of FIG. 9.
Figure 7:
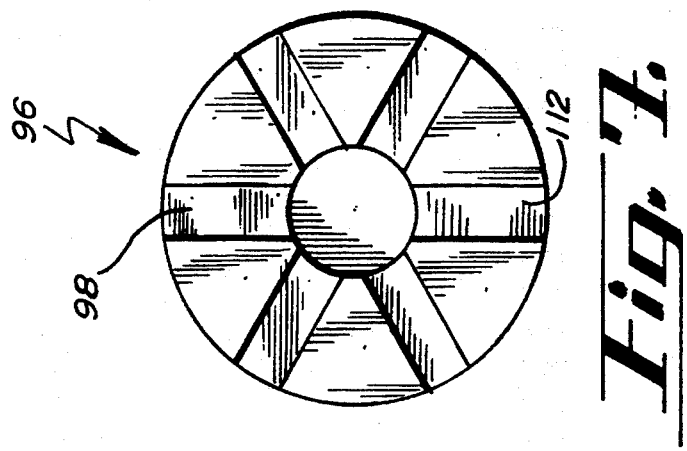
FIG. 7 is a sectional view along the line 7—7 of FIG. 6.

With his other hand, the operator presses the cycle start button 160. Pressing the button 160 causes the gripper air cylinder 90 to be activated, causing the ram 92 through the bearing assembly 94 to move the plunger 96 forwardly, toward the rotating oil filter canister 10. See FIG. 10. As the plunger 96 moves forwardly, the pin 106 slides along the slot 110 in the gripper arm 84, causing the gripper arm 84 to be drawn inwardly toward the central core 73 of the chuck body 72 along the radial channels 82. Simultaneously, the inner end 108 of the gripper arm 84 will slide along the horizontal wall 104 of the plunger gripper arm cut-out 98. The gripper arms 84 will thus move inwardly until the gripper plates 88 contact the oil filter canister 10. The rough surfaces 89 of the gripper plates 88 will grip and hold the canister 10, causing the canister 10 to rotate with the chuck 50. The finger cut-outs 112 will prevent the plunger 96 from contacting the fingers 76.

Figure 12:
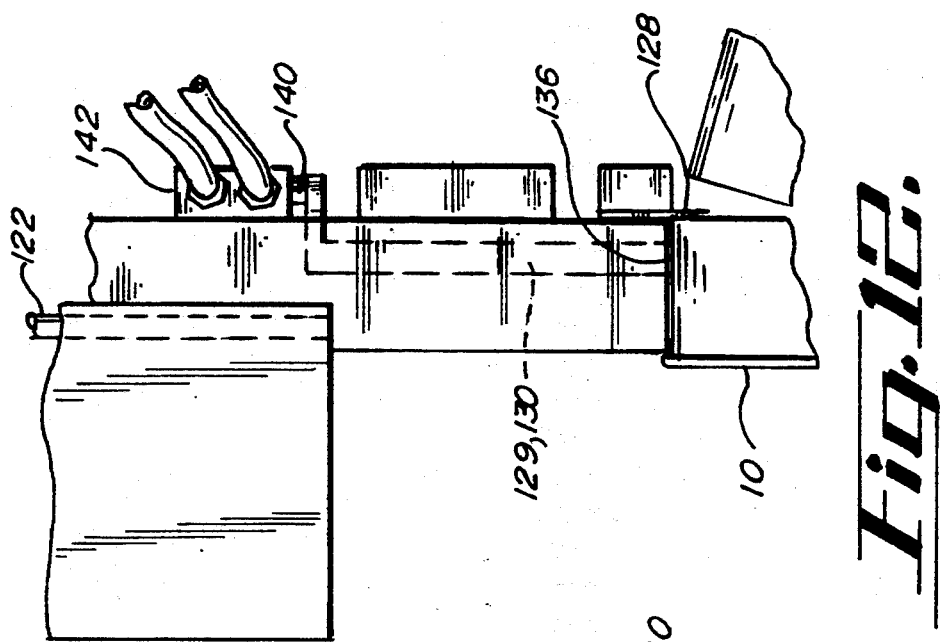
FIG. 12 is a cut-away detail of the cutting head assembly after cutting an oil filter canister.

FIG. 12 shows the cutting operation. As soon as the gripper arms 84 have gripped the canister 10, the cutter air cylinder 152 will be activated, causing the ram 154, controlled by the regulator 156, to force the cutting blade 128 and the wear button 136 against the rotating filter canister 10. The cutting blade 128 will then cut into the canister 10, making a concentric cut as the canister 10 rotates. The sensor means 129 is then activated, as follows. As soon as the blade 128 drops into the cut in the canister 10, the wear button 136 will be pressed upwardly by the canister 10, causing the return actuator arm 130 to move upward against the spring 132 and roller 140. The roller 140 will cause the air switch 142 to close, starting the air timer 158. The timer 158 will count off enough of a time delay to allow the cutting blade 128 to complete one additional revolution around the canister 10. The timer 158 then signals the air cylinder 152 to retract the ram 154, thus retracting the blade 128 away from the canister 10.

The gripper air cylinder 90 then causes its ram 92 to retract, causing the plunger 96 to move rearwardly away from the canister 10. As the plunger 96 moves rearwardly, the pin 106 will slide along the slot 110, causing the gripper arm 84 to move outwardly away from the central core 73 along the radial channel 82, thus releasing the filter canister 10. Both the canister 10 and its severed end plate 14 then drop free from the chuck 50.

The operator then removes the oil and paper insert 18 from the cut canister 10. The oil is drained along the inclined top 42 of the cutting machine table 40 and onto the adjacent oil drain table 24. The oil drain table 24 has a central drain 25 which leads to an oil storage tank 26.

The remaining parts of the invention are the canister crusher 28, paper insert crusher 30, conveyors 32 and 34, and storage bins 35.

Figure 13:
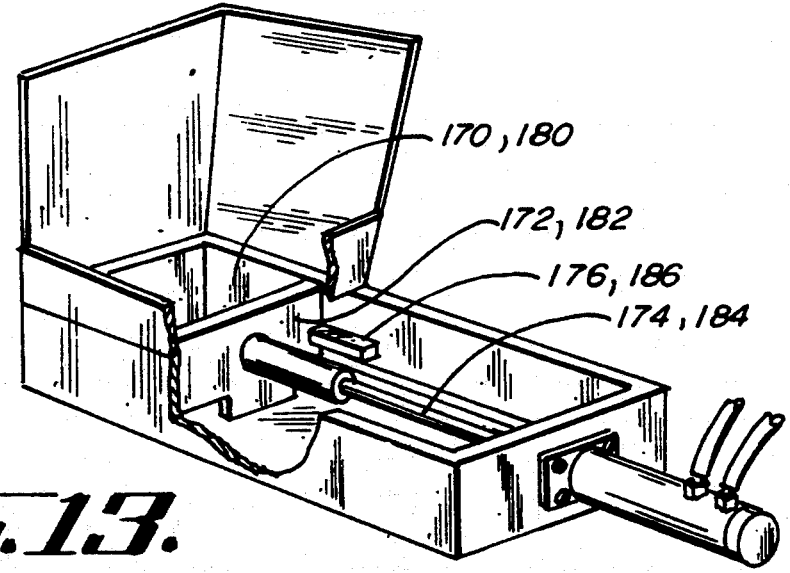
FIG. 13 is a detailed perspective of a canister crusher or paper insert crusher, with some structure cut away.

The canister crusher 28 can be seen in FIG. 13. The canister crusher 28 comprises a canister crushing hopper 170 into which the operator places cut oil filter canisters 10 to be crushed. The operator then actuates a canister crusher control means (not shown) such as a switch, causing a canister crushing plate 172 to be brought against the oil filter canister 10 by a canister crushing ram 174. The canister crushing plate 172 is prevented from moving from side to side by a guide bar 176. As the canister is being crushed, oil from the canister drains out of the canister crushing hopper 170 through a slot (not shown) and into a receiving tank (not shown). After the oil filter canister 10 has been crushed, the operator causes the canister crushing ram 174 and plate 172 to retract, so that the crushed canister may be removed from the canister crushing hopper. The operator then places the crushed canister onto the canister conveyor 32 for transport to a storage bin 35.

The paper insert crusher 28 can be seen in FIG. 13. The paper insert crusher 28 comprises a paper insert crushing hopper 180 into which the operator places oil filter paper inserts 18 to be crushed. The operator then actuates a paper insert crusher control means (not shown) such as a switch, causing a paper insert crushing plate 182 to be brought against the oil filter paper insert 18 by a paper insert crushing ram 184. The paper insert crushing plate 182 is prevented from moving from side to side by a guide bar 186. As the paper insert is being crushed, oil from the paper insert drains out of the paper insert crushing hopper 180 through a slot (not shown) and into a receiving tank (not shown). After the oil filter paper insert has been crushed, the operator causes the paper insert crushing ram 184 and plate 182 to retract, so that the crushed paper insert may be removed from the paper insert crushing hopper. The operator then places the crushed paper insert onto the paper insert conveyor 34 for transport to a storage bin 35.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for recycling oil filter canisters, comprising:
   an oil filter canister cutting machine, further comprising a gripping chuck adapted for gripping and rotating oil filter canisters, means for rotating the gripping chuck, and a cutting head assembly adapted to contact and cut the oil filter canister while the oil filter canister is rotating on the chuck,
   a table with an inclined top,
   a cabinet mounted on the table, said cabinet having a hinged front lid, said lid having an access cut-out for accessing the gripping chuck,
   means for collecting and storing used oil from the oil filter canisters,
   a canister crusher,
   a paper insert crusher, and
   means for transporting crushed canisters and crushed paper inserts between the canister crusher, the paper insert crusher, and respective storage bins.

2. An apparatus for recycling oil filter canisters as in claim 1, wherein the gripping chuck further comprises:
   a chuck body, means for gripping the oil filter canister, said gripping means being mounted on the chuck body, wherein the gripping means further comprises a plurality of gripper arms slidably mounted in the chuck body and reciprocating radially therein, and indexing means for centering the oil filter canister on the chuck body, said indexing means being mounted on the chuck body.

3. An apparatus for recycling oil filter canisters as in claim 2, wherein the indexing means further comprises a plurality of spring-biased, pivoting index fingers indexing into a hole in the base plate of the oil filter canister.

4. An apparatus for recycling oil filter canisters as in claim 1, wherein the means for rotating the chuck comprises an electric motor, driver gear, and idler gear.

5. An apparatus for recycling oil filter canisters as in claim 2, wherein the gripping chuck further comprises:
 a gripper air cylinder disposed behind the chuck body,
 a bearing assembly connected to the ram of the gripper air cylinder, and
 a plunger, connected to the bearing assembly and to the gripper arms, for causing the gripper arms to reciprocate radially within the chuck body to grip the oil filter canister.

6. An apparatus for recycling oil filter canisters as in claim 1, wherein the cutting head assembly further comprises:
 a housing slidably mounted on the cabinet,
 a cutting blade, removably mounted on the housing,
 a return actuator arm, slidably mounted within the housing and biased by a spring toward the rotating oil filter canister,
 a wear button on the return actuator arm parallel to the cutting blade and contacting the rotating oil filter canister simultaneously with the cutting blade,
 a switch, connected to the return actuator arm,
 means for moving the cutting blade against the rotating oil filter canister,
 means for regulating the force with which the cutting blade contacts the rotating oil filter canister, and
 a timer, responsive to the switch, for delaying the cutting blade from retracting from the rotating oil filter canister.

7. An apparatus for recycling oil filter canisters as in claim 1, further comprising control means for coordinating the action of the gripping chuck, chuck rotating means, and cutting head assembly.

8. An apparatus for recycling oil filter canisters, comprising:
 an oil filter canister cutting machine,
 a canister crusher, and
 a paper insert crusher,
 wherein the oil filter canister cutting machine further comprises:
  a table with an inclined top,
  a cabinet mounted on the table, said cabinet having a hinged front lid, said lid having a plurality of access cut-outs,
  a plurality of gripping chucks mounted on the cabinet and accessible by means of the access cut-outs, adapted for gripping and rotating oil filter canisters,
  means for rotating the gripping chucks,
  a plurality of cutting head assemblies adapted to contact and cut the oil filter canister while the oil filter canister is rotating on the chuck, and
  control means for coordinating the action of the gripping chucks, chuck rotating means, and cutting head assemblies.

9. An apparatus for recycling oil filter canisters as in claim 8, wherein the gripping chuck further comprises:
 a chuck plate gear, driven by the chuck rotating means,
 a substantially cylindrical chuck body, attached to the chuck plate gear, the chuck body having a front face with a plurality of radial channels and a central core with an open center,
 a plurality of gripper arms slidably mounted in the radial channels and reciprocating radially within the channels, the gripper arms each having a gripper bar on its surface, each gripper bar having a gripper plate for gripping the oil filter canister mounted parallel to the central core of the chuck body, and
 a plurality of spring-biased, pivoting fingers for indexing into a hole in the base plate of the oil filter canister, the fingers being pivoted within the chuck body and biased toward the front face of the chuck body by springs and thereby disposed concentrically within the center ring to index the canister.

10. An apparatus for recycling oil filter canisters as in claim 8, wherein the means for rotating the chuck comprises an electric motor, driver gear, and idler gear.

11. An apparatus for recycling oil filter canisters as in claim 9, wherein the gripping chuck further comprises:
 a gripper air cylinder disposed behind the central core of the chuck body,
 a bearing assembly connected to the ram of the gripper air cylinder, and
 a plunger, connected to the bearing assembly and to the gripper arms, for causing the gripper arms to reciprocate radially within the radial channels to grip the oil filter canister.

12. An apparatus for recycling oil filter canisters as in claim 11, wherein the plunger has a gripper arm cut-out, the gripper arm has a cam-shaped inner end which slidably engages with the gripper arm cut-out, a pin is mounted in the gripper arm cut-out, and the pin engages slidably with a slot in the gripper arm to draw the gripper arm radially inwardly and outwardly as the plunger moves axially forwardly and rearwardly.

13. An apparatus for recycling oil filter canisters as in claim 8, wherein the cutting head assembly further comprises:
 a backing plate mounted on the cutting machine cabinet,
 a guide rail mounted on the backing plate,
 a housing slidably mounted on the guide rail,
 a cutting blade, removably mounted on the housing,
 a return actuator arm, slidably mounted within the housing and biased by a spring toward the rotating air filter,
 a wear button on the return actuator arm parallel to the cutting blade and contacting the rotating oil filter simultaneously with the cutting blade,
 an air switch, connected to the return actuator arm by a roller,
 a cutter air cylinder connected to the housing, for moving the housing against the rotating oil filter canister, a regulator, for regulating the force with which the cutter air cylinder causes the cutting blade to contact the rotating oil filter, and an air timer, responsive to the air switch, for delaying the cutter air cylinder to retract the cutting blade from the rotating oil filter.

14. An apparatus for recycling oil filter canisters as in claim 8, wherein the control means further comprises:
a cycle start button, for causing the gripping chuck to grip the oil filter,
a reset button, for causing the cutting head assembly to reset against the rotating oil filter, and
the appropriate compressed air source, air valves, controls and tubing to actuate and coordinate the gripping chuck and cutting head assembly.

15. An apparatus for recycling oil filter canisters as in claim 8, wherein the canister crusher further comprises:
a canister crushing hopper for receiving oil filter canisters to be crushed,
a canister crushing plate, reciprocating within the canister crushing hopper, for crushing the oil filter canisters,
a canister crushing ram, for driving the canister crushing plate against the oil filter canisters,
a guide bar for guiding the canister crushing ram, and
means for controlling the operation of the canister crusher.

16. An apparatus for recycling oil filter canisters as in claim 8, wherein the paper insert crusher further comprises:
a paper insert crushing hopper for receiving paper inserts to be crushed,
a paper insert crushing plate, reciprocating within the paper insert crushing hopper, for crushing the paper inserts,
a paper insert crushing ram, for driving the paper insert crushing plate against the paper inserts,
a guide bar for guiding the paper insert crushing ram, and
means for controlling the operation of the paper insert crusher.

17. An apparatus for recycling oil filter canisters as in claim 8, further comprising an oil drain table adjacent to the cutting machine.

18. An apparatus for recycling oil filter canisters as in claim 17, further comprising an oil storage tank, for receiving oil from the oil drain table.

19. An apparatus for recycling oil filter canisters as in claim 8, further comprising conveyors, connected to the canister crusher and paper insert crusher, for transporting crushed canisters and crushed paper inserts, respectively, between the canister crusher, the paper insert crusher, and respective storage bins.

20. An apparatus for recycling oil filter canisters comprising an oil filter canister cutting machine, further comprising:
a gripping chuck adapted for gripping and rotating oil filter canisters,
means for rotating the gripping chuck, and
a cutting head assembly adapted to contact and cut the oil filter canister while the oil filter canister is rotating on the chuck,
wherein the gripping chuck further comprises:
a chuck plate gear, driven by the chuck rotating means,
a substantially cylindrical chuck body, attached to the chuck plate gear, the chuck body having a front face with a plurality of radial channels and a central core with an open center,
a plurality of gripper arms slidably mounted in the radial channels and reciprocating radially within the channels, the gripper arms each having a gripper bar on its surface, each gripper bar having a gripper plate for gripping the oil filter canister mounted parallel to the central core of the chuck body, and
a plurality of spring-biased, pivoting fingers for indexing into a hole in the base plate of the oil filter canister, the fingers being pivoted within the chuck body and biased toward the front face of the chuck body by springs and thereby disposed concentrically within the center ring to index the canister.

* * * * *